US012236255B2

(12) United States Patent
Grande, Jr. et al.

(10) Patent No.: US 12,236,255 B2
(45) Date of Patent: Feb. 25, 2025

(54) NUMA NODE VIRTUAL MACHINE PROVISIONING SYSTEM

(71) Applicant: Dell Products L.P., Round Rock, TX (US)

(72) Inventors: Jose Miguel Grande, Jr., Round Rock, TX (US); Yi-Shu Hung, Taipei (TW)

(73) Assignee: Dell Products L.P., Round Rock, TX (US)

( * ) Notice: Subject to any disclaimer, the term of this patent is extended or adjusted under 35 U.S.C. 154(b) by 697 days.

(21) Appl. No.: 17/511,960

(22) Filed: Oct. 27, 2021

(65) Prior Publication Data
US 2023/0132345 A1 Apr. 27, 2023

(51) Int. Cl.
*G06F 9/455* (2018.01)
*G06F 9/50* (2006.01)
*G06F 13/42* (2006.01)

(52) U.S. Cl.
CPC ........ *G06F 9/45558* (2013.01); *G06F 9/5016* (2013.01); *G06F 13/4221* (2013.01); *G06F 2009/45562* (2013.01); *G06F 2009/45583* (2013.01)

(58) Field of Classification Search
CPC ............... G06F 9/45558; G06F 9/5016; G06F 13/4221; G06F 2009/45562; G06F 2009/45583
See application file for complete search history.

(56) References Cited

U.S. PATENT DOCUMENTS

| | | | |
|---|---|---|---|
| 2010/0251234 A1* | 9/2010 | Oshins | G06F 9/4856 718/1 |
| 2013/0151569 A1* | 6/2013 | Therien | G06F 11/3672 707/803 |
| 2021/0019260 A1 | 1/2021 | Delehanty et al. | |
| 2023/0012606 A1* | 1/2023 | Merrifield | G06F 9/45558 |

* cited by examiner

*Primary Examiner* — Jacob D Dascomb
(74) *Attorney, Agent, or Firm* — Joseph Mencher

(57) ABSTRACT

A Non-Uniform Memory Access (NUMA) node virtual machine provisioning system includes a connection system and a physical NUMA node coupled to a NUMA node virtual machine provisioning subsystem that modifies NUMA node information in at least one database to create a first virtual NUMA node that is provided by a first subset of NUMA node resources in the physical NUMA node, modifies connection system information in the at least one database to dedicate a first subset of connection system resources in the connection system to the first virtual NUMA node, and deploys a first virtual machine on the first virtual NUMA node such that the first virtual machine performs operations using the first subset of NUMA node resources that provide the first virtual NUMA node, and using the first subset of connection system resources dedicated to the first virtual NUMA node.

17 Claims, 7 Drawing Sheets

NUMA NODE VIRTUAL MACHINE PROVISIONING SYSTEM

BACKGROUND

The present disclosure relates generally to information handling systems, and more particularly to providing virtual machines on Non-Uniform Memory Access (NUMA) nodes in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, server devices, utilize Non-Uniform Memory Access (NUMA) systems, which one of skill in the art will recognize include a computer memory design for multiprocessing where memory access times depend on the memory location relative to the processor. For example, NUMA systems may include NUMA nodes that each have a respective processor subsystem and memory subsystem, with a processor subsystem in a NUMA node accessing its local memory subsystem in that NUMA node faster than non-local memory subsystems in other NUMA nodes (or non-local memory subsystems that are shared between processor subsystems in different NUMA nodes), and tend to provide benefits for workloads on server devices that include data that is relatively strongly associated with particular tasks or users. In some situations, NUMA systems may be utilized to provide virtual machines, but the operation of conventional NUMA systems can raise some issues with respect to the provisioning of virtual machines. For example, conventional NUMA systems allocate NUMA resources to virtual machines based on the number of physical NUMA nodes, which limits users to dedicating resources to virtual machines provided on a NUMA system based on the number of physical NUMA nodes in that NUMA system.

Accordingly, it would be desirable to provide a virtual machine NUMA node provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Non-Uniform Memory Access (NUMA) node virtual machine provisioning engine that is configured to: modify, in at least one database, NUMA node information to create a first virtual NUMA node that is provided by a first subset of NUMA node resources in a physical NUMA node; modify, in the at least one database, connection system information to dedicate a first subset of connection system resources in a connection system to the first virtual NUMA node; and deploy a first virtual machine on the first virtual NUMA node such that the first virtual machine performs operations using the first subset of NUMA node resources that provide the first virtual NUMA node, and using the first subset of connection system resources dedicated to the first virtual NUMA node.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
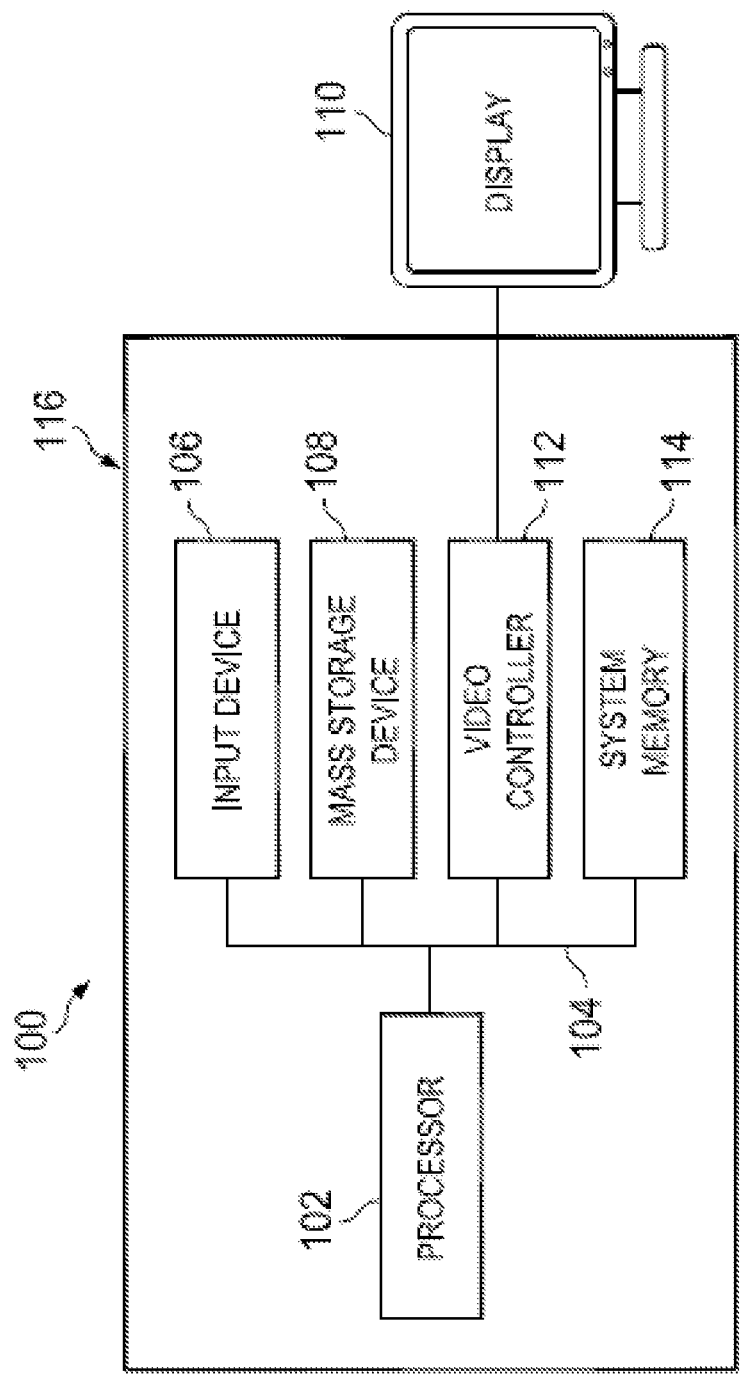
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
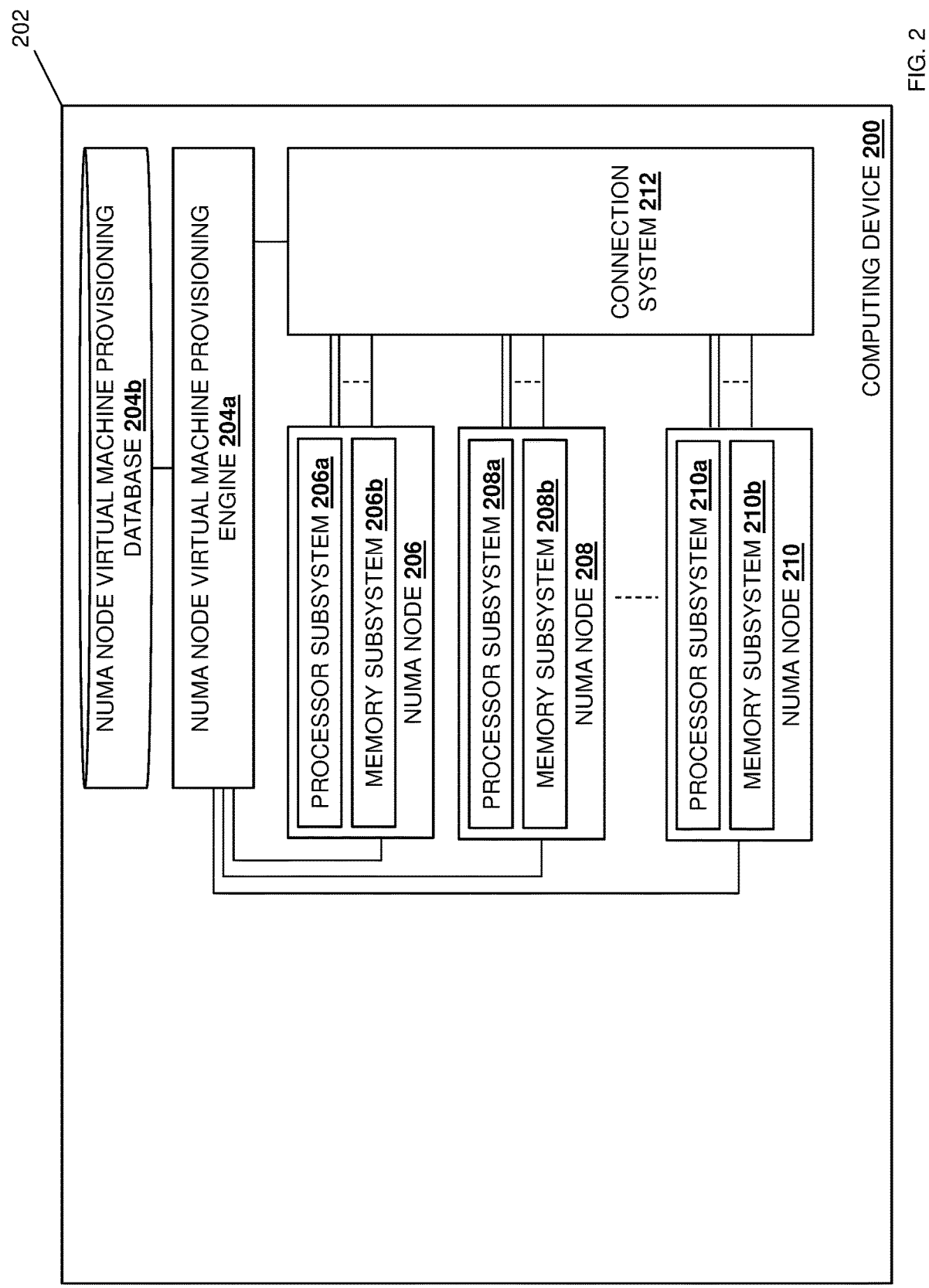
FIG. 2 is a schematic view illustrating an embodiment of a computing device that includes the NUMA node virtual machine provisioning system of the present disclosure.

Referring now to FIG. 2, an embodiment of a computing device 200 is illustrated that provides the NUMA node virtual machine provisioning system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a NUMA node virtual machine provisioning engine 204a that is configured to perform the functionality of the NUMA node virtual machine provisioning engines and/or computing devices discussed below.

The chassis 202 may also house a storage system (not illustrated, but which may include the storage 108 discussed above with reference to FIG. 1) that is coupled to the NUMA node virtual machine provisioning engine 204a (e.g., via a coupling between the storage system and the processing system) and that includes a NUMA node virtual machine provisioning database 204b that is configured to store any of the information utilized by the NUMA node virtual machine provisioning engine 204a discussed below. In some embodiments, the processing system, memory system, and storage system discussed above may provide a NUMA node virtual machine provisioning subsystem that includes the NUMA node virtual machine provisioning engine 204a and the NUMA node virtual machine provisioning database 204b discussed above. For example, the NUMA node virtual machine provisioning subsystem may be provided by a Basic Input/Output System (BIOS) that includes one or more databases that store the NUMA node information and the connection system information discussed below.

In a specific example, the one or more databases utilized by the NUMA node virtual machine provisioning engine 204a may store an Advanced Configuration and Power Interface (ACPI) System Resource Affinity Table (SRAT) that one of skill in the art in possession of the present disclosure will recognize may store topology information for processing subsystems and memory subsystems in the computing device 200 that describes physical locations of processing subsystems and memory subsystems, identifies hot-pluggable memory subsystems and non-hot-pluggable memory subsystems, and/or includes other SRAT information known in the art. The one or more databases utilized by the NUMA node virtual machine provisioning engine 204a may also store an ACPI System Locality distance Information Table (SLIT) that one of skill in the art in possession of the present disclosure will recognize may identify relative differences in access latency between NUMA node, and/or other SLIT information known in the art. The one or more databases utilized by the NUMA node virtual machine provisioning engine 204a may also store an ACPI Differentiated System Description Table (DSDT) that one of skill in the art in possession of the present disclosure will recognize may store information about supported power events in the computing device 200, and/or other DSDT information known in the art.

The chassis 202 may also house a plurality of NUMA nodes that each include a respectively processing subsystem and memory subsystem, with each of those NUMA nodes referred to in some of the examples below as "physical NUMA nodes" (i.e., including hardware processors/memory devices) in order to distinguish them from the "virtual NUMA nodes" that are created and operated using those physical NUMA nodes. In the illustrated embodiments, the chassis 202 houses a physical NUMA node 206 including a hardware processing subsystem 206a (e.g., Central Processing Unit(s) (CPU(s)), CPU cores, a CPU cache, etc.) and a hardware memory subsystem 206b (e.g., memory device(s), a memory controller, a memory cache, etc.), a physical NUMA node 208 including a hardware processing subsystem 208a (e.g., CPU(s), CPU cores, a CPU cache, etc.) and a hardware memory subsystem 208b (e.g., memory device(s), a memory controller, a memory cache, etc.), and up to a physical NUMA node 210 including a hardware processing subsystem 210a (e.g., CPU(s), CPU cores, a CPU cache, etc.) and a hardware memory subsystem 210b (e.g., memory device(s), a memory controller, a memory cache, etc.). However, while more than two NUMA nodes are illustrated in the examples provided herein, one of skill in the art in possession of the present disclosure will appreciate that the computing device 200 may include only two NUMA nodes while remaining within the scope of the present disclosure as well. As will be appreciated by one of skill in the art in possession of the present disclosure, each the processing subsystems 206a, 208a, and 210a may include a processor (e.g., a Central Processing Unit) and each of the memory subsystems 206b, 208b, and 210b may include a plurality of memory devices, but embodiments in which NUMA nodes include more than one processor (or processor cores) are envisioned as falling within the scope of the present disclosure as well.

The chassis 202 may also house a connection system 212 that is coupled to each of the NUMA nodes 206, 208, and 210, with the specific examples provided herein illustrating multiple connections between the connection system 212 and each NUMA node 206, 208, and 210. For example, the connection system 212 may be provided by a Peripheral Component Interconnect (PCI) connection system that includes a plurality of PCI hardware resources and that is connected to each of the NUMA nodes 206, 208, and 210 via a plurality of PCI lanes, although other connection systems connected to the NUMA nodes 206, 208, and up to 210 in other manners will fall within the scope of the present disclosure as well. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
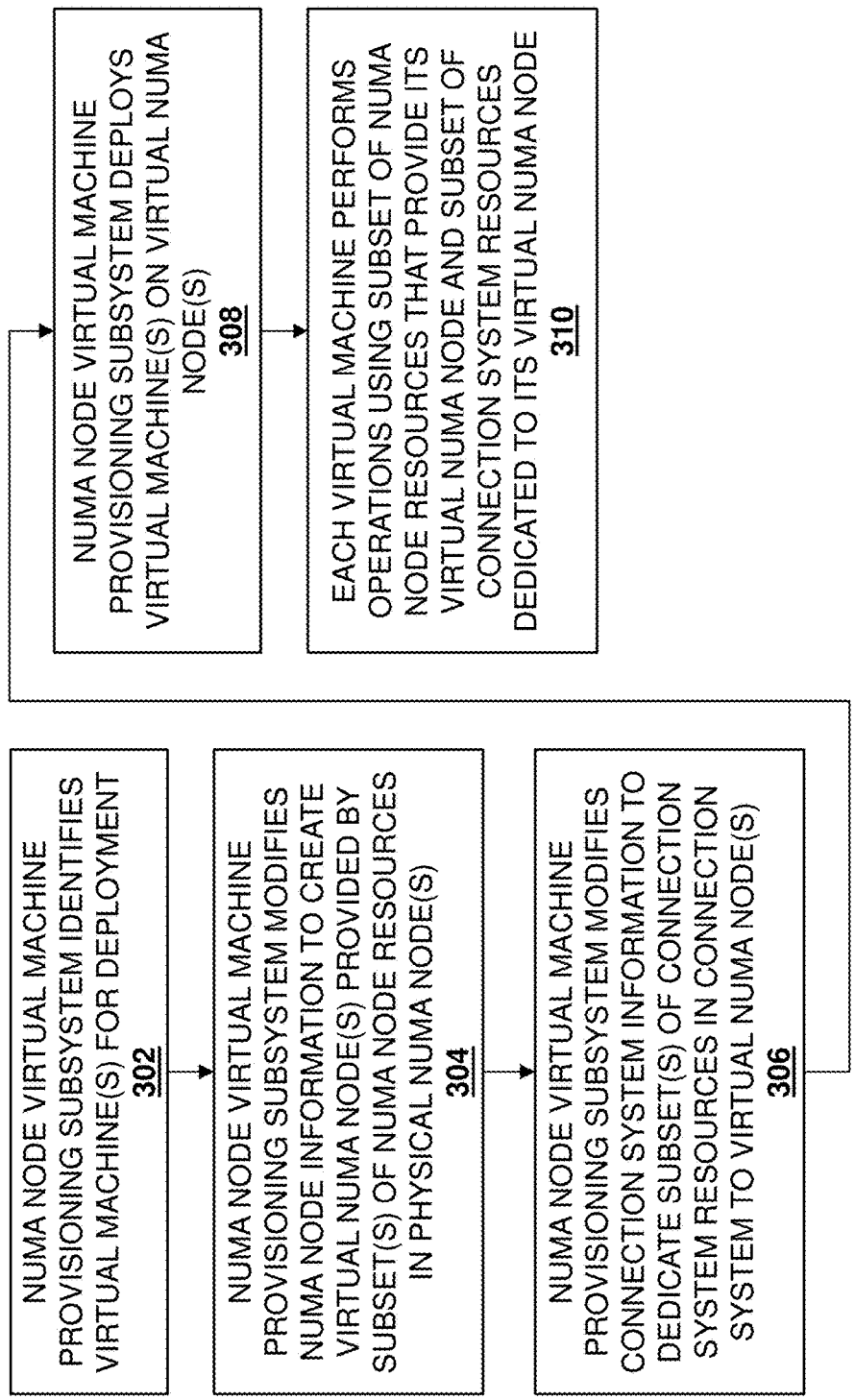
FIG. 3 is a flow chart illustrating an embodiment of a method for providing virtual machines on NUMA nodes.

Referring now to FIG. 3, an embodiment of a method 300 for providing virtual machines on NUMA nodes is illustrated. As discussed below, the systems and methods of the present disclosure create virtual NUMA nodes using subsets of physical NUMA node resources in NUMA nodes in a NUMA system, and then dedicate connection system resources to each of those virtual NUMA nodes. For example, the Non-Uniform Memory Access (NUMA) node virtual machine provisioning system of the present disclosure may include a connection system and a physical NUMA node coupled to a NUMA node virtual machine provisioning subsystem that modifies NUMA node information in at least one database to create a first virtual NUMA node that is provided by a first subset of NUMA node resources in the physical NUMA node, modifies connection system information in the at least one database to dedicate a first subset of connection system resources in the connection system to the first virtual NUMA node, and then deploys a first virtual machine on the first virtual NUMA node such that the first virtual machine performs operations using the first subset of NUMA node resources that provide the first virtual NUMA node, and using the first subset of connection system resources dedicated to the first virtual NUMA node. As will be appreciate by one of skill in the art in possession of the present disclosure, virtual machines deployed on the virtual NUMA nodes provided according to the teachings of the present disclosure will operate more efficiently than on conventional NUMA systems.

Figure 4:
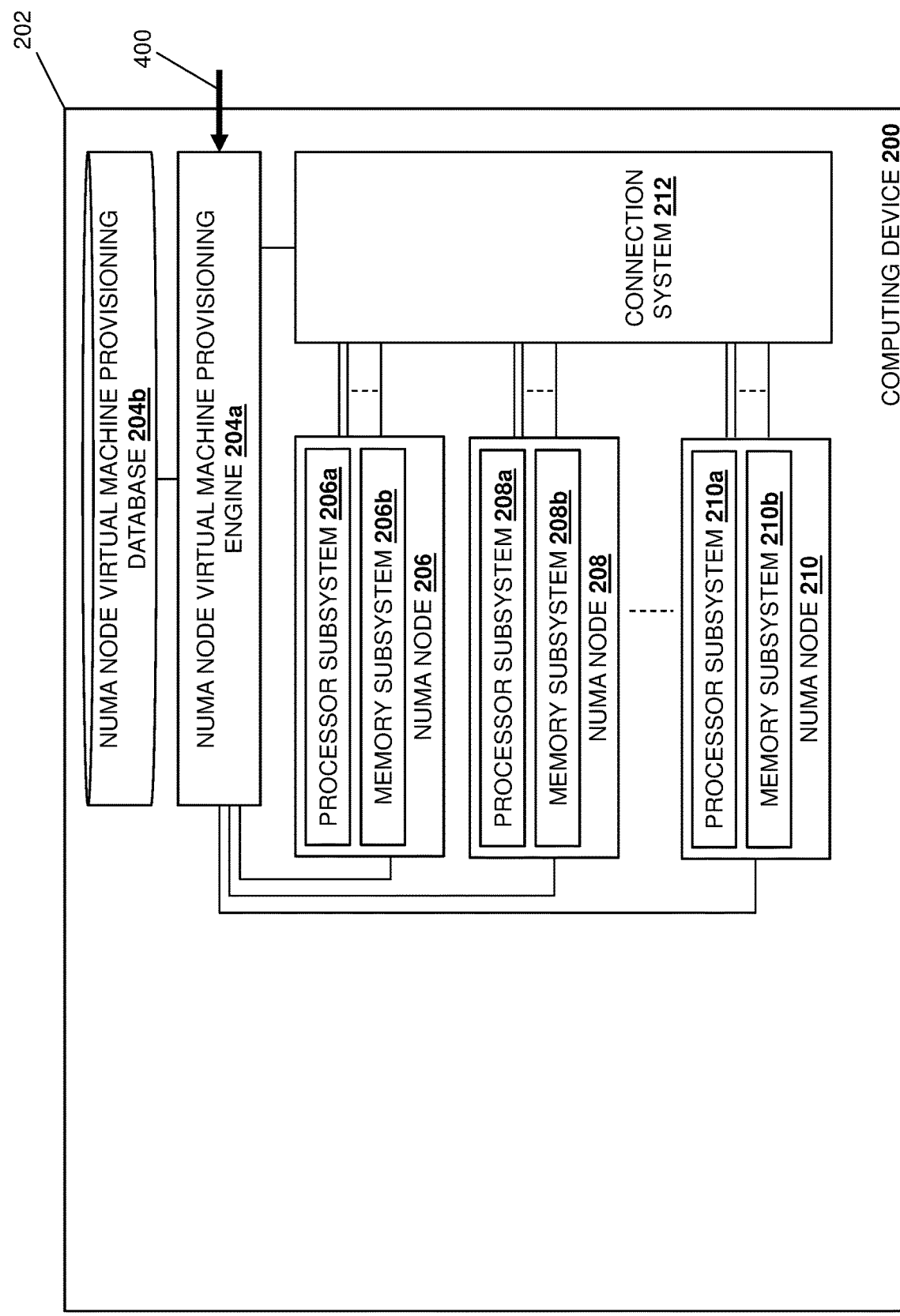
FIG. 4 is a schematic view illustrating an embodiment of the computing device of FIG. 2 during the method of FIG. 3.

The method 300 begins at block 302 where a NUMA node virtual machine provisioning subsystem identifies virtual machine(s) for deployment. With reference to FIG. 4, in an embodiment of block 302, the NUMA node virtual machine provision engine 204a may perform virtual machine identification operations 400 that may include identifying one or more virtual machines for deployment om the computing device 200. For example, in some embodiments, the method 300 may be performed each time a virtual machine is provided for deployment on the computing device 200, and thus the NUMA node virtual machine provision engine 204a may identify a single virtual machine for deployment on the computing device 200 at block 302. However, in other embodiments, the method 300 may be performed when a plurality of virtual machines are provided for deployment on the computing device 200, and thus the NUMA node virtual machine provision engine 204a may identify a multiple virtual machines for deployment on the computing device 200 at block 302. As described in further detail below, in situations where more than one virtual machine is identified for deployment on the computing device 200 and each of those virtual machines is prioritized (or otherwise dealt with) equally, the NUMA node virtual machine provision engine 204a may split NUMA node resources of the NUMA nodes 206, 208, and up to 210 and connection system resources of the connection system 212 equally between those virtual machines.

However, in some embodiments in which multiple virtual machines are identified at block 302, those virtual machines may be prioritized relative to each other based on their expected performance levels (e.g., performance levels of the workload(s) they will run, Service Level Agreements (SLAs) associated with those virtual machines, etc.) and/or other virtual machine characteristics that would be apparent to one of skill in the art in possession of the present disclosure. As such, and as described in further detail below, the NUMA node virtual machine provision engine 204a may allocate NUMA node resources of the NUMA nodes 206, 208, and up to 210 and connection system resources of the connection system 212 to those virtual machines differently based on their relative priorities. However, while two specific examples are provided, one of skill in the art in possession of the present disclosure will appreciate how virtual machines with a variety of different characteristics may be identified in a variety of manners that will fall within the scope of the present disclosure as well.

Figure 5:
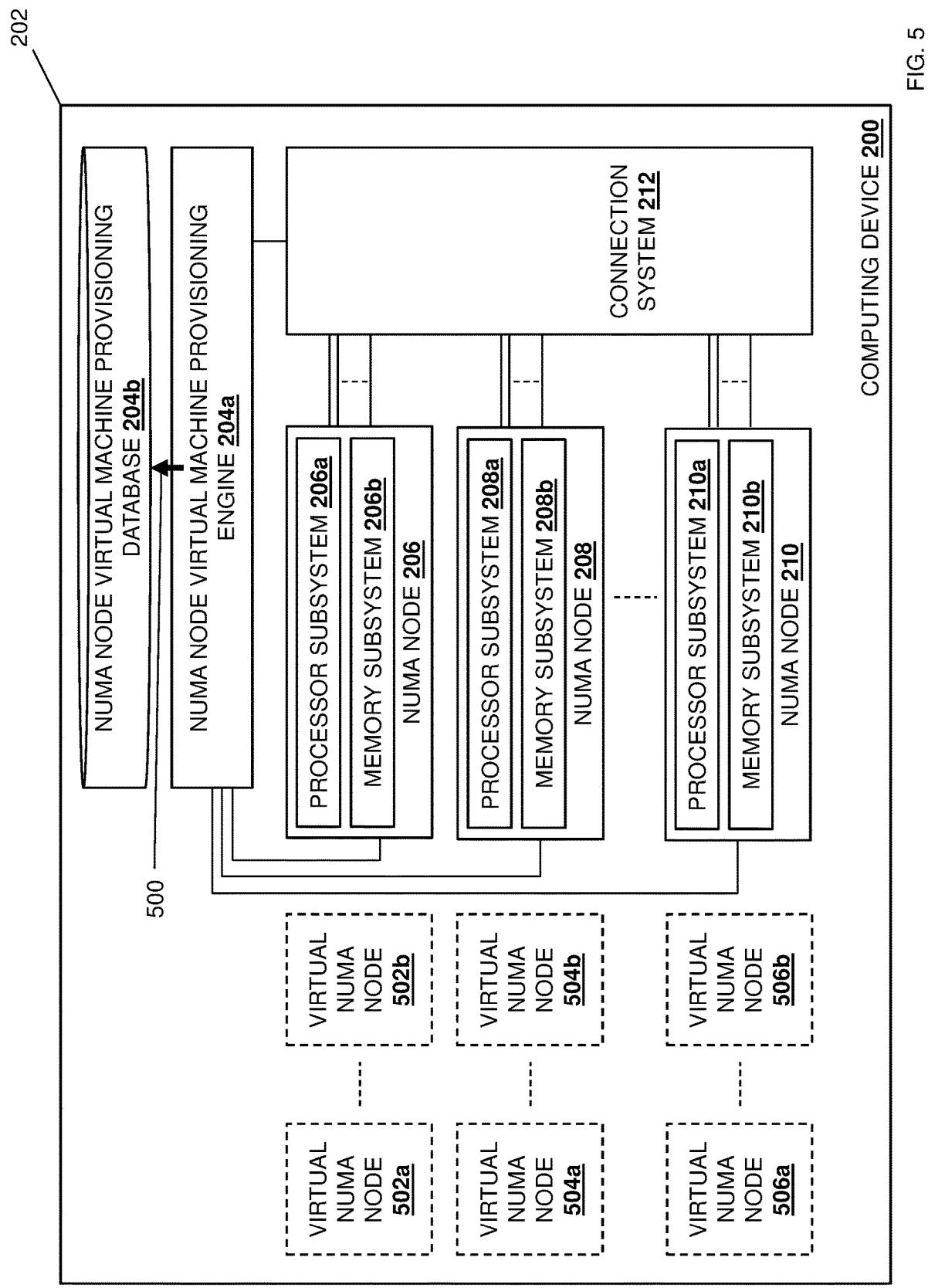
FIG. 5 is a schematic view illustrating an embodiment of the computing device of FIG. 2 during the method of FIG. 3.

The method 300 then proceeds to block 304 where the NUMA node virtual machine provisioning subsystem modifies NUMA node information to create virtual NUMA node(s) provided by subset(s) of NUMA node resources in physical NUMA node(s). With reference to FIG. 5, in an embodiment of block 304, the NUMA node virtual machine provision engine 204a may perform NUMA node information modification operations 500 that may include modifying NUMA node information stored in the NUMA node virtual machine provisioning database 204b to create virtual NUMA nodes 502a and up to 502b on the physical NUMA node 206, create virtual NUMA nodes 504a and up to 504b on the physical NUMA node 208, and create virtual NUMA nodes 506a and up to 506b on the physical NUMA node 210. However, while multiple virtual NUMA nodes are illustrated and described as being created on each of the physical NUMA nodes in the computing device 200, one of skill in the art in possession of the present disclosure will appreciate how the creation of different numbers of virtual NUMA nodes on different numbers of physical NUMA nodes (e.g., a single virtual NUMA node on a single physical NUMA node) at block 304 will fall within the scope of the present disclosure as well.

Continuing with the specific example provided above, the modification of the NUMA node information by the NUMA node virtual machine provision engine 204a at block 304 may include the modification of information in an ACPI SRAT and an ACPI SLIT in order to configure subsets of NUMA node resources in physical NUMA nodes to provide virtual NUMA nodes. For example, the ACPI SRAT may be modified to increase a total number of proximity/processor/NUMA domains by separating each proximity/processor/NUMA domain in half. To provide a specific example, in a situation where the ACPI SRAT defines processors "0", "1", "2", and "3" initially belonging to proximity/processor/NUMA domain "0", and processors "4", "5", "6" and "7" initially belonging to proximity/processor/NUMA domain "1", the ACPI SRAT may be modified such that processors "0" and "1" belong to proximity/processor/NUMA domain "0", processors "2" and "3" belong to proximity/processor/ NUMA domain "1", processors "4" and "5" belong to proximity/processor/NUMA domain "2", and processors "6" and "7" belong to proximity/processor/NUMA domain "3".

In another example, the ACPI SLIT may be modified to increase a total number of proximity/processor/NUMA domains by increasing the size of the latency/distance array. To provide a specific example, the ACPI SLIT may initially define the latency/distance array as:

| NODE | 0  | 1  | 2  | 3  |
|------|----|----|----|----|
| 0    | 10 | 15 | 20 | 20 |
| 1    | 15 | 10 | 15 | 20 |
| 2    | 20 | 15 | 10 | 15 |
| 3    | 20 | 30 | 15 | 10 |

The ACPI SLIT may then be modified to provide the following latency distance array:

| NODE | 0  | 1  | 2  | 3  | 4  | 5  | 6  | 7  |
|------|----|----|----|----|----|----|----|----|
| 0    | 10 | 10 | 15 | 15 | 20 | 20 | 20 | 20 |
| 1    | 10 | 10 | 15 | 15 | 20 | 20 | 20 | 20 |
| 2    | 15 | 15 | 10 | 10 | 15 | 15 | 20 | 20 |
| 3    | 15 | 15 | 10 | 10 | 15 | 15 | 20 | 20 |
| 4    | 20 | 20 | 15 | 15 | 10 | 10 | 15 | 15 |
| 5    | 20 | 20 | 15 | 15 | 10 | 10 | 15 | 15 |
| 6    | 20 | 20 | 20 | 20 | 15 | 15 | 10 | 10 |
| 7    | 20 | 20 | 20 | 20 | 15 | 15 | 10 | 10 |

However, while the number of NUMA nodes in the specific examples above are simply doubled, one of skill in the art in possession of the present disclosure will appreciate how the number of NUMA nodes may be increased in different amounts to provide for more optimized operation depending on the requirements of the situation.

As such, at block 304 the NUMA node virtual machine provision engine 204a may modify information in an ACPI SRAT and an ACPI SLIT in order to configure a first subset of resources in the processing subsystem 206a and a first subset of resources in the memory subsystem 206b in the physical NUMA node 206 to provide the virtual NUMA node 502a, and configure a second subset of resources in the processing subsystem 206a and a second subset of resources in the memory subsystem 206b in the physical NUMA node 206 to provide the virtual NUMA node 502b (while also configuring other respective subsets of resources in the processing subsystem 206a/memory subsystem 206b in the physical NUMA node 206 to provide any virtual NUMA nodes "between" the virtual NUMA nodes 502a and 502b).

Similarly, at block 304 the NUMA node virtual machine provision engine 204a may modify information in the ACPI SRAT and the ACPI SLIT in order to configure a first subset of resources in the processing subsystem 208a and a first subset of resources in the memory subsystem 208b in the physical NUMA node 208 to provide the virtual NUMA node 504a, and configure a second subset of resources in the processing subsystem 208a and a second subset of resources in the memory subsystem 208b in the physical NUMA node 208 to provide the virtual NUMA node 504b (while also configuring other respective subsets of resources in the processing subsystem 208a/memory subsystem 208b in the physical NUMA node 208 to provide any virtual NUMA nodes "between" the virtual NUMA nodes 504a and 504b). Similarly as well, at block 304 the NUMA node virtual machine provision engine 204a may modify information in the ACPI SRAT and the ACPI SLIT in order to configure a first subset of resources in the processing subsystem 210a and a first subset of resources in the memory subsystem 210b in the physical NUMA node 210 to provide the virtual NUMA node 506a, and configure a second subset of resources in the processing subsystem 210a and a second subset of resources in the memory subsystem 210b in the physical NUMA node 210 to provide the virtual NUMA node 506b (while also configuring other respective subsets of resources in the processing subsystem 210a/memory subsystem 210b in the physical NUMA node 210 to provide any virtual NUMA nodes "between" the virtual NUMA nodes 506a and 506b).

As discussed above, in some embodiments, NUMA node resources of the physical NUMA nodes 206, 208, and up to 210 may be equally split between virtual NUMA nodes they provide. As such, block 304 may be performed such that the first subset of resources in the processing subsystem 206a and memory subsystem 206a in the physical NUMA node 206 that provide the virtual NUMA node 502a, the second subset of resources in the processing subsystem 206a and memory subsystem 206a in the physical NUMA node 206 that provide the virtual NUMA node 502b, the first subset of resources in the processing subsystem 208a and memory subsystem 208a in the physical NUMA node 208 that provide the virtual NUMA node 504a, the second subset of resources in the processing subsystem 208a and memory subsystem 208a in the physical NUMA node 208 that provide the virtual NUMA node 504b, the first subset of resources in the processing subsystem 210a and memory subsystem 210a in the physical NUMA node 210 that provide the virtual NUMA node 506a, and the second subset of resources in the processing subsystem 210a and memory subsystem 210a in the physical NUMA node 210 that provide the virtual NUMA node 506b, are all equal (e.g., the virtual NUMA nodes 502a, 502b, 504a, 504b, 506a and 506b may each be provided using the same number of CPU cores, memory devices, memory controller resources, cache resources, and/or other processing/memory components).

However, in other embodiments, NUMA node resources of the physical NUMA nodes 206, 208, and up to 210 may provide virtual NUMA nodes based on the relative priorities of the virtual machine(s) those virtual NUMA nodes will provide. As such, block 304 may be performed such that the subset of resources in a processing subsystem and memory subsystem used to provide any virtual NUMA node is based on the relative priority of the virtual machine(s) that will be deployed on that virtual NUMA node. Thus, block 304 may be performed such that the first subset of resources in the processing subsystem 206a and memory subsystem 206a in the physical NUMA node 206 that provide the virtual NUMA node 502a that will provide relatively high priority virtual machine(s) is greater than the second subset of resources in the processing subsystem 206a and memory subsystem 206a in the physical NUMA node 206 that provide the virtual NUMA node 502b that will provide relatively lower priority virtual machine(s) (e.g., the virtual NUMA node 502a may be provided using a larger number of CPU cores, memory devices, memory controller resources, cache resources, and/or other processing/memory components than the virtual NUMA node 502b), and one of skill in the art in possession of the present disclosure will appreciate how differing amounts of NUMA node resources may be utilized to provide different virtual NUMA nodes based on the relatively priorities of virtual machines they will provide in any of variety of manners that will fall within the scope of the present disclosure. Furthermore, combinations of equal NUMA node resource distribution (e.g., from a first physical NUMA node to provide its virtual NUMA nodes) and different NUMA node resource distribution (e.g., from a second physical NUMA node to provide its virtual NUMA nodes) will fall within the scope of the present disclosure as well.

As will be appreciated by one of skill in the art in possession of the present disclosure, the modification of the NUMA node information at block 304 may allow any virtual NUMA node that is created to maintain the latency/distance data of the physical NUMA node that provides it (i.e., for purposes of operating system reference), while providing each virtual NUMA nodes with different memory range corresponding to the portion of memory resources used to provide that virtual NUMA node. However, while a specific example of the creation of virtual NUMA nodes is illustrated and described, one of skill in the art in possession of the present disclosure will appreciate that virtual NUMA nodes may be created using other techniques while remaining within the scope of the present disclosure as well.

Some conventional NUMA systems operate to modify information in an ACPI SRAT and ACPI SLIT in order to remedy issues with reporting NUMA resources to the WINDOWS® operating system available from MICROSOFT® Corporation of Redmond, Washington, United States. For example, in some NUMA systems, NUMA resources are reported by the BIOS to the WINDOWS® operating system correctly, but the WINDOWS® operating system interprets the reported information incorrectly and ends up creating virtual NUMA nodes that it reports as processor sockets that do not exist and that end up not being used, which can result in improper memory allocation and a logical core imbalance (per NUMA node). As such, the conventional NUMA systems discussed above modify information in an ACPI SRAT and ACPI SLIT to eliminate this WINDOWS®-operating-system-specific issue. As will be appreciated by one of skill in the art in possession of the present disclosure, the inventors of the present disclosure have discovered that such ACPI SRAT/SLIT information modification techniques can be leveraged with the additional operations described herein in order to greatly enhance the operation of virtual machines on virtual NUMA nodes provided on a physical NUMA system.

Figure 6:
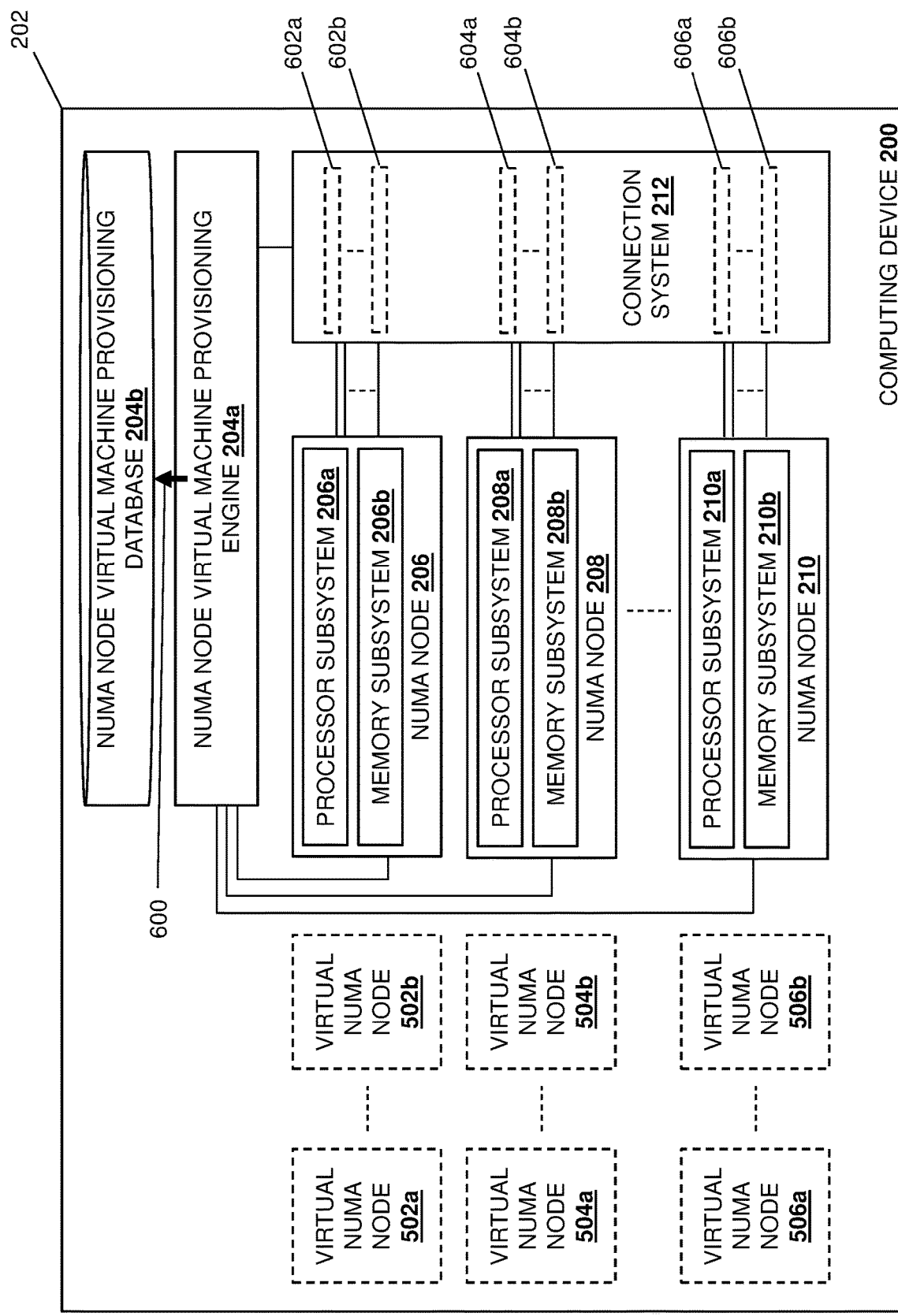
FIG. 6 is a schematic view illustrating an embodiment of the computing device of FIG. 2 during the method of FIG. 3.

The method 300 then proceeds to block 306 where the NUMA node virtual machine provisioning subsystem modifies connection system information to dedicate subset(s) of connection system resources in a connection system to the virtual NUMA node(s). With reference to FIG. 6, in an embodiment of block 306, the NUMA node virtual machine provision engine 204a may perform connection system information modification operations 600 that may include modifying connection system information stored in the NUMA node virtual machine provisioning database 204b to dedicate a subset 602a of the connection system resources in the connection system 212 to the virtual NUMA node 502a, dedicate a subset 602b of the connection system resources in the connection system 212 to the virtual NUMA node 502b, dedicate a subset 604a of the connection system resources in the connection system 212 to the virtual NUMA node 504a, dedicate a subset 604b of the connection system resources in the connection system 212 to the virtual NUMA node 504b, dedicate a subset 606a of the connection system resources in the connection system 212 to the virtual NUMA node 506a, and dedicate a subset 606b of the connection system resources in the connection system 212 to the virtual NUMA node 506b. However, while multiple virtual NUMA nodes are illustrated and described as being dedicated connection system resources in the connection system 212, one of skill in the art in possession of the present disclosure will appreciate how the dedication of different numbers of connection resources in the connection system 212 to different numbers of virtual machines (e.g., dedicating a single subset of connection resources in the connection system 212 to a single virtual machine) at block 306 will fall within the scope of the present disclosure as well.

Continuing with the specific example provided above, the modification of the connection system information by the NUMA node virtual machine provision engine 204a at block 306 may include the modification of information in an ACPI DSDT in order to dedicate subsets of connection system resources in the connection system 212 to virtual NUMA nodes. For example, the ACPI DSDT may be modified by modifying an ACPI method_PXM for all PCI root ports from the same NUMA node to split those PCI root ports evenly between two virtual NUMA nodes. As will be appreciated by one of skill in the art in possession of the present disclosure, all PCIe root ports/devices will have a dedicated NUMA domain number, and a user may bind a particular domain to a particular virtual machine to provide that virtual machine maximum performance. As such, at block 306 the NUMA node virtual machine provision engine 204a may modify information in an ACPI DSDT in order to dedicate a first subset of connection system resources (e.g., PCI hardware resources, PCI lanes, etc.) in the connection system 212 to the first subset of resources in the processing subsystem 206a and the first subset of resources in the memory subsystem 206b in the physical NUMA node 206 that provide the virtual NUMA node 502a, and dedicate a second subset of connection system resources (e.g., PCI hardware resources, PCI lanes, etc.) in the connection system 212 to the second subset of resources in processing subsystem 206a and the second subset of resources in the memory subsystem 206b in the physical NUMA node 206 that provide the virtual NUMA node 502b (while also dedicating other subsets of connection system resources in the connection system 212 to other respective subsets of resources in the processing subsystem 206a/memory subsystem 206b in the physical NUMA node 206 that provide any virtual NUMA nodes "between" the virtual NUMA nodes 502a and 502b).

Similarly, at block 306 the NUMA node virtual machine provision engine 204a may modify information in an ACPI DSDT in order to dedicate a third subset of connection system resources (e.g., PCI hardware resources, PCI lanes, etc.) in the connection system 212 to the first subset of resources in the processing subsystem 208a and the first subset of resources in the memory subsystem 208b in the physical NUMA node 208 that provide the virtual NUMA node 504a, and dedicate a fourth subset of connection system resources (e.g., PCI hardware resources, PCI lanes, etc.) in the connection system 212 to the second subset of resources in processing subsystem 208a and the second subset of resources in the memory subsystem 208b in the physical NUMA node 208 that provide the virtual NUMA node 504b (while also dedicating other subsets of connection system resources in the connection system 212 to other respective subsets of resources in the processing subsystem 208a/memory subsystem 208b in the physical NUMA node 208 that provide any virtual NUMA nodes "between" the virtual NUMA nodes 504a and 504b).

Similarly as well, at block 306 the NUMA node virtual machine provision engine 204a may modify information in an ACPI DSDT in order to dedicate a fifth subset of connection system resources (e.g., PCI hardware resources, PCI lanes, etc.) in the connection system 212 to the first subset of resources in the processing subsystem 210a and the first subset of resources in the memory subsystem 210b in the physical NUMA node 208 that provide the virtual NUMA node 506a, and dedicate a sixth subset of connection system resources (e.g., PCI hardware resources, PCI lanes, etc.) in the connection system 212 to the second subset of resources in processing subsystem 210a and the second subset of resources in the memory subsystem 210b in the physical NUMA node 210 that provide the virtual NUMA node 506b (while also dedicating other subsets of connection system resources in the connection system 212 to other respective subsets of resources in the processing subsystem 210a/memory subsystem 210b in the physical NUMA node 210 that provide any virtual NUMA nodes "between" the virtual NUMA nodes 506a and 506b).

However, while the discussion above describes dedicating connection system resources (e.g., PCI hardware resources, PCI lanes, etc.) in the connection system 212 to each virtual NUMA node, one of skill in the art in possession of the present disclosure will appreciate that such dedicated connection system resource/virtual NUMA node embodiments are a best-case scenario and may not be realized in all situations. For example, in situations in which there are enough connection system resources in the connection system 212 to allow separate connection system resources in the connection system 212 to be dedicated to each of the virtual NUMA nodes, then each virtual NUMA node in the NUMA node virtual machine system of the present disclosure may operate optimally/with dedicated connection system resources. However, in situations in which there is a number of virtual NUMA nodes created on the computing device 200 that exceeds the connection system resources in the connection system 212 (i.e., the number of virtual NUMA nodes created will not allow separate connection system resources in the connection system 212 to be dedicated to each of the virtual NUMA nodes), then respective connection system resources in the connection system 212 may be dedicated to subsets of the virtual NUMA nodes that may then share those connection system resources.

To provide a simplified example of such a virtual NUMA node shared-connection-system-resource embodiment, at block 306 the NUMA node virtual machine provision engine 204a may modify information in an ACPI DSDT in order to dedicate a first subset of connection system resources (e.g., PCI hardware resources, PCI lanes, etc.) in the connection system 212 to the processing subsystem 206a and the memory subsystem 206b in the physical NUMA node 206 that provide the virtual NUMA nodes 502a and up to 502b (which may then subsequently share that first subset of connection system resources), dedicate a second subset of connection system resources (e.g., PCI hardware resources, PCI lanes, etc.) in the connection system 212 to the processing subsystem 208a and the memory subsystem 208b in the physical NUMA node 208 that provide the virtual NUMA nodes 504a and up to 504b (which may then subsequently share that second subset of connection system resources), and dedicate a third subset of connection system resources (e.g., PCI hardware resources, PCI lanes, etc.) in the connection system 212 to the processing subsystem 210a and the memory subsystem 210b in the physical NUMA node 210 that provide the virtual NUMA nodes 506a and up to 506b (which may then subsequently share that third subset of connection system resources). However, while a specific example is described, one of skill in the art in possession of the present disclosure will appreciate how connection resources in the communication system 212 may be configured to be shared by any number of virtual NUMA nodes while remaining within the scope of the present disclosure as well.

Furthermore, similarly as discussed above, in some embodiments connection resources of the connections system 212 may be equally split between the virtual NUMA nodes to which they are dedicated. As such, block 306 may be performed such that the first subset, second subset, third subset, fourth subset, fifth subset, and sixth subset of connection system resources in the connection system 212 discussed above are equal (e.g., equal amounts of PCI hardware resources, equal numbers of PCI lanes, etc.). However, in other embodiments, connection system resources in the connection system 212 may be dedicated to virtual NUMA nodes based on the relative priorities of the virtual machine(s) those virtual NUMA nodes will provide. As such, block 306 may be performed such that the subset of connection system resources in the connection system 212 dedicated to any virtual NUMA node is based on the relative priority of the virtual machine(s) that will be deployed on that virtual NUMA node. Thus, block 304 may be performed such that the first subset of connection resources dedicated to the virtual NUMA node 502a that will provide relatively high priority virtual machine(s) are greater than the second subset of connection system resources in the connection system 212 dedicated to the virtual NUMA node 502b that will provide relatively lower priority virtual machine(s) (e.g., the virtual NUMA node 502a may have a larger number of PCI lanes, PCI hardware resources, and/or other connection components than the virtual NUMA node 502b), and one of skill in the art in possession of the present disclosure will appreciate how differing amounts of connection system resources may be dedicated to different virtual NUMA nodes based on the relative priorities of virtual machines they will provide in any of variety of manners that will fall within the scope of the present disclosure.

Figure 7:
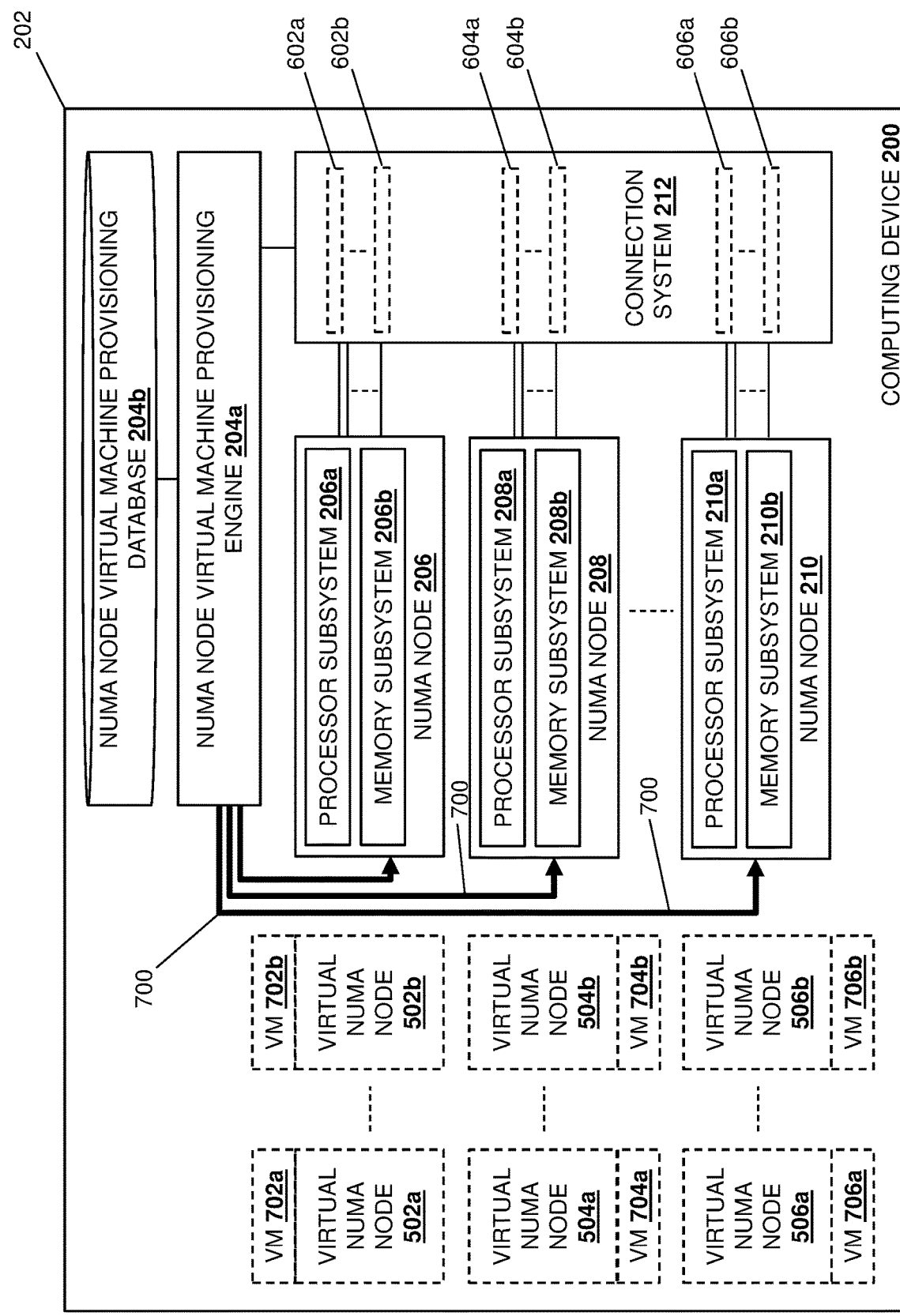
FIG. 7 is a schematic view illustrating an embodiment of the computing device of FIG. 2 during the method of FIG. 3.

The method 300 then proceeds to block 308 where the NUMA node virtual machine provisioning subsystem deploys virtual machine(s) on the virtual NUMA node(s). Referring now FIG. 7, in an embodiment of block 308, the NUMA node virtual machine provisioning engine 204a may perform virtual machine deployment operations 700 in order to deploy a virtual machine 702a on the virtual NUMA node 502a provided by the first subset of resources in the processing subsystem 206a and the first subset of resources in the memory subsystem 206b in the physical NUMA node 206, deploy a virtual machine 702b on the virtual NUMA node 502b provided by the second subset of resources in the processing subsystem 206a and the second subset of resources in the memory subsystem 206b in the physical NUMA node 206, deploy a virtual machine 704a on the virtual NUMA node 504a provided by the first subset of resources in the processing subsystem 208a and the first subset of resources in the memory subsystem 208b in the physical NUMA node 208, deploy a virtual machine 704b on the virtual NUMA node 504b provided by the second subset of resources in the processing subsystem 208a and the second subset of resources in the memory subsystem 208b in the physical NUMA node 208, deploy a virtual machine 706a on the virtual NUMA node 506a provided by the first subset of resources in the processing subsystem 210a and the first subset of resources in the memory subsystem 210b in the physical NUMA node 210, and deploy a virtual machine 706b on the virtual NUMA node 506b provided by the second subset of resources in the processing subsystem 210*a* and the second subset of resources in the memory subsystem 210*b* in the physical NUMA node 210.

The method 300 then proceeds to block 310 where each virtual machine performs operations using the subset of NUMA node resources that provide its virtual NUMA node and the subset of connection resources dedicated to its virtual NUMA node. In an embodiment, at block 310, the virtual machine 702*a* deployed on the virtual NUMA node 502*a* may perform operations using the first subset of resources in the processing subsystem 206*a* and the first subset of resources in the memory subsystem 206*b* in the physical NUMA node 206 that provide the virtual NUMA node 502*a*, and the first subset of connection system resources in the connection system 212 that are dedicated to the virtual NUMA node 502*a*. Similarly, at block 310, the virtual machine 702*b* deployed on the virtual NUMA node 502*b* may perform operations using the second subset of resources in the processing subsystem 206*a* and the second subset of resources in the memory subsystem 206*b* in the physical NUMA node 206 that provide the virtual NUMA node 502*b*, and the second subset of connection system resources in the connection system 212 that are dedicated to the virtual NUMA node 502*b*.

Similarly as well, at block 310, the virtual machine 704*a* deployed on the virtual NUMA node 504*a* may perform operations using the first subset of resources in the processing subsystem 208*a* and the first subset of resources in the memory subsystem 208*b* in the physical NUMA node 208 that provide the virtual NUMA node 504*a*, and the third subset of connection system resources in the connection system 212 that are dedicated to the virtual NUMA node 504*a*. Similarly as well, at block 310, the virtual machine 704*b* deployed on the virtual NUMA node 504*b* may perform operations using the second subset of resources in the processing subsystem 208*a* and the second subset of resources in the memory subsystem 208*b* in the physical NUMA node 208 that provide the virtual NUMA node 504*b*, and the fourth subset of connection system resources in the connection system 212 that are dedicated to the virtual NUMA node 504*b*.

Similarly as well, at block 310, the virtual machine 706*a* deployed on the virtual NUMA node 506*a* may perform operations using the first subset of resources in the processing subsystem 210*a* and the first subset of resources in the memory subsystem 210*b* in the physical NUMA node 210 that provide the virtual NUMA node 506*a*, and the fifth subset of connection system resources in the connection system 212 that are dedicated to the virtual NUMA node 506*a*. Similarly as well, at block 310, the virtual machine 706*b* deployed on the virtual NUMA node 506*b* may perform operations using the second subset of resources in the processing subsystem 210*a* and the second subset of resources in the memory subsystem 210*b* in the physical NUMA node 210 that provide the virtual NUMA node 506*b*, and the sixth subset of connection system resources in the connection system 212 that are dedicated to the virtual NUMA node 506*b*.

However, as discussed above, situations may exist in which there is a number of virtual NUMA nodes created on the computing device that exceeds the connection system resources in the connection system 212 (i.e., the number of virtual NUMA nodes created will not allow separate connection system resources in the connection system 212 to be dedicated to each of the virtual NUMA nodes), and the NUMA node virtual machine provisioning system of the present disclosure may dedicate respective connection system resources in the connection system 212 to subsets of the virtual NUMA nodes that may then share those connection system resources. As such, continuing with the simplified example provided above, at block 310, the virtual machine 702*a* deployed on the virtual NUMA node 502*a* may perform operations using the first subset of resources in the processing subsystem 206*a* and the first subset of resources in the memory subsystem 206*b* in the physical NUMA node 206 that provide the virtual NUMA node 502*a*, the virtual machine 702*b* deployed on the virtual NUMA node 502*b* may perform operations using the second subset of resources in the processing subsystem 206*a* and the second subset of resources in the memory subsystem 206*b* in the physical NUMA node 206 that provide the virtual NUMA node 502*b*, with the virtual machines 702*a* and 702*b* sharing the first subset of connection system resources in the connection system 212 that are dedicated to the processing subsystem 206*a* and the memory subsystem 206*b* in the physical NUMA node 206 that provide the virtual NUMA nodes 502*a* and up to 502*b*.

Similarly, at block 310, the virtual machine 704*a* deployed on the virtual NUMA node 504*a* may perform operations using the first subset of resources in the processing subsystem 208*a* and the first subset of resources in the memory subsystem 208*b* in the physical NUMA node 208 that provide the virtual NUMA node 504*a*, the virtual machine 704*b* deployed on the virtual NUMA node 504*b* may perform operations using the second subset of resources in the processing subsystem 208*a* and the second subset of resources in the memory subsystem 208*b* in the physical NUMA node 208 that provide the virtual NUMA node 504*b*, with the virtual machines 704*a* and 704*b* sharing the second subset of connection system resources in the connection system 212 that are dedicated to the processing subsystem 208*a* and the memory subsystem 208*b* in the physical NUMA node 208 that provide the virtual NUMA nodes 504*a* and up to 504*b*.

Similarly as well, at block 310, the virtual machine 706*a* deployed on the virtual NUMA node 506*a* may perform operations using the first subset of resources in the processing subsystem 210*a* and the first subset of resources in the memory subsystem 210*b* in the physical NUMA node 210 that provide the virtual NUMA node 506*a*, the virtual machine 706*b* deployed on the virtual NUMA node 506*b* may perform operations using the second subset of resources in the processing subsystem 210*a* and the second subset of resources in the memory subsystem 210*b* in the physical NUMA node 210 that provide the virtual NUMA node 506*b*, with the virtual machines 706*a* and 706*b* sharing the third subset of connection system resources in the connection system 212 that are dedicated to the processing subsystem 210*a* and the memory subsystem 210*b* in the physical NUMA node 210 that provide the virtual NUMA nodes 506*a* and up to 506*b*.

Thus, systems and methods have been described that create virtual NUMA nodes using subsets of physical NUMA node resources in physical NUMA nodes in a NUMA system, and then dedicates PCI system resources to each of those virtual NUMA nodes, allowing virtual machines deployed on the virtual NUMA nodes to operate more efficiently than on conventional NUMA systems. For example, the Non-Uniform Memory Access (NUMA) node virtual machine provisioning system of the present disclosure may include a PCI system and a physical NUMA node coupled to a NUMA node virtual machine provisioning subsystem that modifies NUMA node information in an ACPI SRAT and an ACPI SLIT in at least one database to create a first virtual NUMA node that is provided by a first subset of NUMA node resources in the physical NUMA node, modifies PCI system information in an ACPI DSDT in the at least one database to dedicate a first subset of PCI system resources in the PCI system to the first virtual NUMA node, and deploys a first virtual machine on the first virtual NUMA node such that the first virtual machine performs operations using the first subset of NUMA node resources that provide the first virtual NUMA node, and using the first subset of PCI system resources dedicated to the first virtual NUMA node. As such, a user of computing device operating according to the teachings of the present disclosure may deploy virtual machines on that computing device that may be allocated/dedicated granular hardware resources such that their operation is optimized in consideration of the capabilities of the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Non-Uniform Memory Access (NUMA) node virtual machine provisioning system, comprising:
   a connection system;
   a physical Non-Uniform Memory Access (NUMA) node that is connected to the connection system; and
   a NUMA node virtual machine provisioning subsystem that is coupled to the connection system and the physical NUMA node, wherein the NUMA node virtual machine provisioning subsystem is configured to:
   modify, in at least one database, NUMA node information to create a first virtual NUMA node that is provided by a first subset of NUMA node resources in the physical NUMA node, and a second virtual NUMA node that is provided by a second subset of NUMA node resources in the physical NUMA node;
   modify, in the at least one database, connection system information to dedicate a first subset of connection system resources in the connection system to the first virtual NUMA node and the second virtual NUMA node;
   deploy a first virtual machine on the first virtual NUMA node such that the first virtual machine performs operations using the first subset of NUMA node resources that provide the first virtual NUMA node, and using the first subset of connection system resources dedicated to the first virtual NUMA node and the second virtual NUMA node; and
   deploy a second virtual machine on the second virtual NUMA node such that the second virtual machine performs operations using the second subset of NUMA node resources that provide the second virtual NUMA node, and using the first subset of connection system resources dedicated to the first virtual NUMA node and the second virtual NUMA node.

2. The system of claim 1, wherein the modification of the NUMA node information creates the first virtual NUMA node and the second virtual NUMA node with unequal subsets of the NUMA node resources in the physical NUMA node.

3. The system of claim 1, wherein the NUMA node information is included in a System Resource Affinity Table (SRAT) and a System Locality distance Information Table (SLIT).

4. The system of claim 1, wherein the connection system is a Peripheral Component Interconnect (PCI) system, and wherein the connection system information is included in a Differentiated System Description Table (DSDT).

5. The system of claim 1, wherein the modification of the connection system information provides separate and equal portions of the first subset of connection system resources to the first virtual NUMA node and the second virtual NUMA node.

6. An Information Handling System (IHS), comprising:
   a processing system; and
   a memory system that is coupled to the processing system and that includes instructions that, when executed by the processing system, cause the processing system to provide a Non-Uniform Memory Access (NUMA) node virtual machine provisioning engine that is configured to:
   modify, in at least one database, NUMA node information to create a first virtual NUMA node that is provided by a first subset of NUMA node resources in a physical NUMA node, and a second virtual NUMA node that is provided by a second subset of NUMA node resources in the physical NUMA node;
   modify, in the at least one database, connection system information to dedicate a first subset of connection system resources in a connection system to the first virtual NUMA node and the second virtual NUMA node;
   deploy a first virtual machine on the first virtual NUMA node such that the first virtual machine performs operations using the first subset of NUMA node resources that provide the first virtual NUMA node, and using the first subset of connection system resources dedicated to the first virtual NUMA node and the second virtual NUMA node; and
   deploy a second virtual machine on the second virtual NUMA node such that the second virtual machine performs operations using the second subset of NUMA node resources that provide the second virtual NUMA node, and using the first subset of connection system resources dedicated to the first virtual NUMA node and the second virtual NUMA node.

7. The IHS of claim 6, wherein the modification of the NUMA node information creates the first virtual NUMA node and the second virtual NUMA node with unequal subsets of the NUMA node resources in the physical NUMA node.

8. The IHS of claim 6, wherein the NUMA node information is included in a System Resource Affinity Table (SRAT) and a System Locality distance Information Table (SLIT).

9. The IHS of claim 6, wherein the connection system is a Peripheral Component Interconnect (PCI) system, and wherein the connection system information is included in a Differentiated System Description Table (DSDT).

10. The IHS of claim 6, wherein the modification of the connection system information provides separate and equal portions of the first subset of connection system resources to the first virtual NUMA node and the second virtual NUMA node.

11. The IHS of claim 10, wherein the first virtual machine and the second virtual machine are configured to share the first subset of connection system resources.

12. A method for providing virtual machines on NUMA nodes, comprising:

modifying, by a Non-Uniform Memory Access (NUMA) node virtual machine provisioning subsystem in at least one database, NUMA node information to create a first virtual NUMA node that is provided by a first subset of NUMA node resources in a physical NUMA node, and a second virtual NUMA node that is provided by a second subset of NUMA node resources in the physical NUMA node;

modifying, by the NUMA node virtual machine provisioning subsystem in the at least one database, connection system information to dedicate a first subset of connection system resources in a connection system to the first virtual NUMA node and the second virtual NUMA node;

deploying, by the NUMA node virtual machine provisioning subsystem, a first virtual machine on the first virtual NUMA node such that the first virtual machine performs operations using the first subset of NUMA node resources that provide the first virtual NUMA node, and using the first subset of connection system resources dedicated to the first virtual NUMA node and the second virtual NUMA node; and deploy a second virtual machine on the second virtual NUMA node such that the second virtual machine performs operations using the second subset of NUMA node resources that provide the second virtual NUMA node, and using the first subset of connection system resources dedicated to the first virtual NUMA node and the second virtual NUMA node.

13. The method of claim 12, wherein the modification of the NUMA node information creates the first virtual NUMA node and the second virtual NUMA node with unequal subsets of the NUMA node resources in the physical NUMA node.

14. The method of claim 12, wherein the NUMA node information is included in a System Resource Affinity Table (SRAT) and a System Locality distance Information Table (SLIT).

15. The method of claim 12, wherein the connection system is a Peripheral Component Interconnect (PCI) system, and wherein the connection system information is included in a Differentiated System Description Table (DSDT).

16. The method of claim 12, wherein the modification of the connection system information provides separate and equal portions of the first subset of connection system resources to the first virtual NUMA node and the second virtual NUMA node.

17. The method of claim 16, wherein the first virtual machine and the second virtual machine are configured to share the first subset of connection system resources.

* * * * *